UNITED STATES PATENT OFFICE.

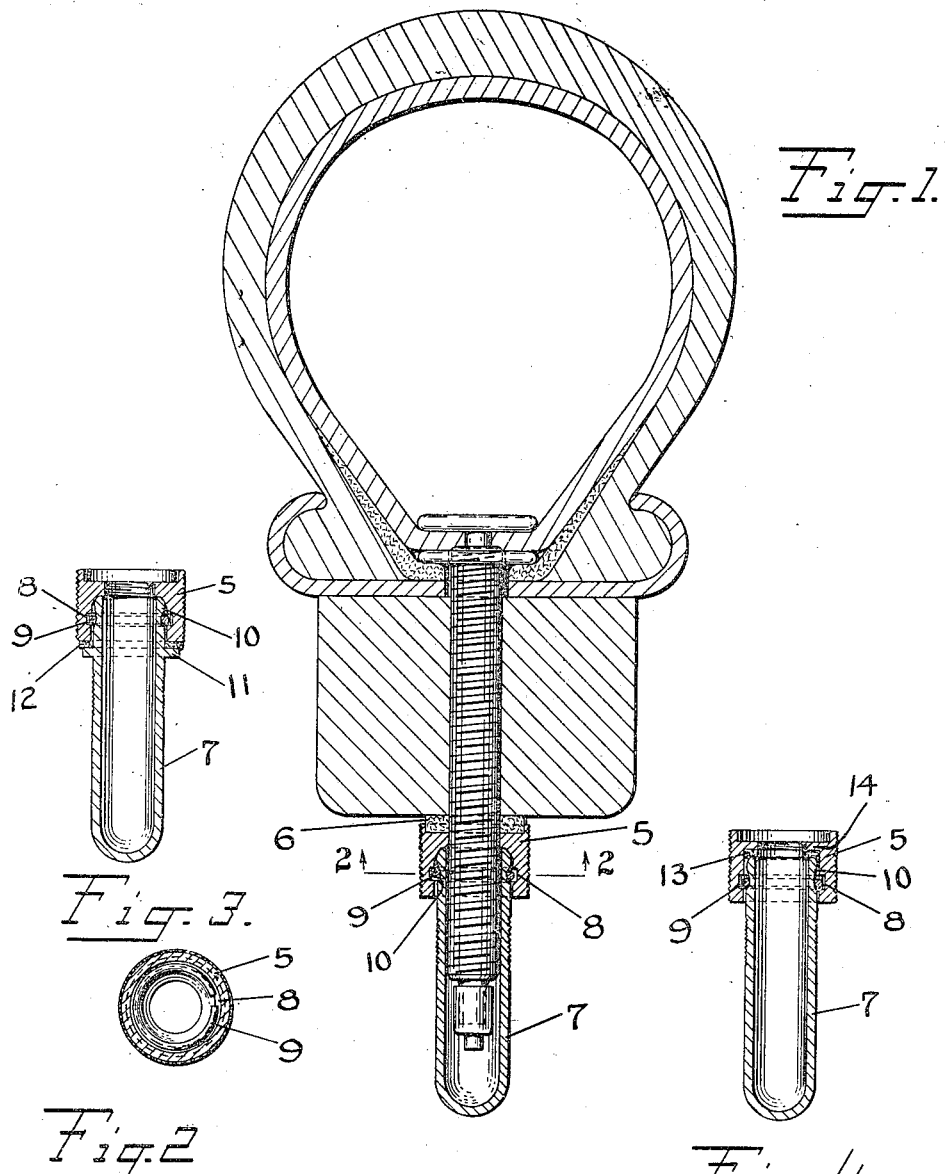

GEORGE F. FISHER AND AUBURN BAILEY, OF PLAINFIELD, NEW JERSEY, ASSIGNORS TO REVERE RUBBER COMPANY, A CORPORATION OF RHODE ISLAND.

DUST-CAP FOR VALVE-STEMS.

1,175,884.     Specification of Letters Patent.     Patented Mar. 14, 1916.

Application filed March 22, 1915. Serial No. 16,028.

*To all whom it may concern:*

Be it known that we, GEORGE F. FISHER and AUBURN BAILEY, both citizens of the United States, and residents of Plainfield, county of Union, and State of New Jersey, have invented certain new and useful Improvements in Dust-Caps for Valve-Stems, of which the following is a full, clear, and exact description.

This invention relates to dust caps for valve-stems, and has for an object to arrange such a device so that the same may be quickly and easily attached to or detached from the protruding valve-stem on a vehicle wheel.

It is customary in automobiles, bicycle and other pneumatic-tired vehicles to provide a protective cap for that portion of the tire valve-stem which projects through the wheel felly, the object being to keep dust or other foreign substances from penetrating between the rim and tire, to protect the valve, and to prevent loss of the valve cap. The ordinary type of dust cap is threaded on its inner wall, and to be put in place, must be screwed on until it abuts the retaining nut on the wheel felly, that is to say, must be screwed the entire distance that the valve-stem protrudes therefrom.

Our invention provides a cap which may be put in place and removed instantaneously, thereby providing immediate accessibility to the valve-stem when it is necessary to inflate or change the tire.

For a clearer understanding of our invention attention is directed to the following description and to the accompanying drawings wherein:

Figure 1 is a transverse sectional view of the rim of a vehilce wheel showing a dust cap made according to our invention applied thereto; Fig. 2 is a cross-sectional view of the retaining nut taken on the line 2—2 of Fig. 1; Fig. 3 is a longitudinal section of a modified construction of the dust cap, and Fig. 4 is a similar view of another modification thereof.

A round retaining nut or ring 5 is threaded to engage the threads on a valve-stem, one end of the nut 5 having seated therein a washer 6 to provide a tight fit against a wheel felly. The other side of the nut is chambered out to receive the end of the dust cap 7, the bore of the cap 7 being large enough to freely slip over the threads of the valve-stem. The inner wall of the nut is provided with an annular groove 8 having loosely seated therein a spring wire bent to form a broken ring 9, but having the ends slightly separated to permit expansion and contraction. The ring 9 is adapted to yieldingly engage an annular groove 10 adjacent the open end of the cap 7 so that a relative push or pull will permit engagement or disengagement thereof. The outer surface of the nut 5 and a portion of the cap 7 are preferably knurled to furnish a more effective grip for the fingers during their respective adjustments.

To prevent rattling of the cap in the nut we have found that the interposition of a resilient washer at some place between their contacting surfaces is extremely effective, and in Figs. 3 and 4 we have shown two means of providing same. In Fig. 3 we provide an annular shoulder 11 adapted to abut a washer 12 positioned between it and the end of the nut 5, a close contact being caused by the pull of the contractile ring 9 in the groove 10. The modification we have shown in Fig. 4 accomplishes the same result by the interposition of the washer 13 between the end of the cap 7 and an annular shoulder 14 in the nut 5.

Having described our invention, what we claim and desire to protect by Letters Patent is:

In a device of the class described, male and female members having grooves oppositely disposed when the members are engaged, and a resilient member housed in said grooves, one of said members having a flaring wall adapted to coöperate with an adjacent wall of another of said members for distorting the resilient member to permit engagement of the male and female members, and one of said members having a wall flaring in an opposite direction to said first flaring wall adapted to coöperate with an adjacent wall of another of said members for distorting the resilient member to permit the disengagement of the male and female members, one of said grooves being of sufficient size to receive the resilient member when distorted to permit the engagement and disengagement of the male and female members.

Signed at the city of New York, county and State of New York this 19th day of March, 1915.

GEORGE F. FISHER.
AUBURN BAILEY.